United States Patent
Kim et al.

(10) Patent No.: US 11,955,611 B2
(45) Date of Patent: Apr. 9, 2024

(54) EQUIPMENT AND METHOD FOR INSPECTING SECONDARY BATTERY

(71) Applicant: LG CHEM, LTD., Seoul (KR)

(72) Inventors: Tae Young Kim, Daejeon (KR); Dong Hyung Lee, Daejeon (KR); Woo Young Choi, Daejeon (KR); Sang Ho Nam, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 670 days.

(21) Appl. No.: 17/257,167

(22) PCT Filed: Dec. 23, 2019

(86) PCT No.: PCT/KR2019/018344
§ 371 (c)(1),
(2) Date: Dec. 30, 2020

(87) PCT Pub. No.: WO2020/251127
PCT Pub. Date: Dec. 17, 2020

(65) Prior Publication Data
US 2021/0184280 A1 Jun. 17, 2021

(30) Foreign Application Priority Data
Jun. 11, 2019 (KR) .................. 10-2019-0068934

(51) Int. Cl.
*H01M 10/48* (2006.01)
*H01M 10/44* (2006.01)

(52) U.S. Cl.
CPC ....... *H01M 10/482* (2013.01); *H01M 10/441* (2013.01)

(58) Field of Classification Search
CPC .................. H01M 10/482; H01M 10/441
See application file for complete search history.

(56) References Cited

U.S. PATENT DOCUMENTS 5,673,540 A * 10/1997 Sanukiya .................. B65B 5/06
53/448
7,951,484 B2 * 5/2011 Mori ....................... B08B 3/022
72/39

(Continued)

FOREIGN PATENT DOCUMENTS

| JP | 6-94624 A | 4/1994 |
| JP | 10-227745 A | 8/1998 |

(Continued)

OTHER PUBLICATIONS

International Search Report (PCT/ISA/210) issued in PCT/KR2019/018344, dated Apr. 16, 2020.

*Primary Examiner* — Michael Jung
(74) *Attorney, Agent, or Firm* — Birch, Stewart, Kolasch & Birch, LLP

(57) ABSTRACT

An equipment for inspecting a secondary battery is provided. The equipment includes a loading device on which a secondary battery is loaded in an upright position, and a side portion inspecting device which inspects a side portion of the secondary battery loaded on the loading device, wherein the side portion inspecting device comprises an elevation unit which lifts the secondary battery loaded on the loading device so as to be withdrawn out of the loading device and allows the secondary battery to return to its original position after a first period of time elapses and a side portion inspecting unit which captures an image of the side portion of the secondary battery, which is withdrawn out of the loading device by the elevation unit, thereby inspecting the side portion of the secondary battery.

15 Claims, 15 Drawing Sheets

(56) References Cited

U.S. PATENT DOCUMENTS

2013/0260211 A1   10/2013  Min et al.
2019/0152634 A1*  5/2019  Almogy .................. B65G 1/06

FOREIGN PATENT DOCUMENTS

| | | |
|---|---|---|
| JP | 2001-188049 A | 7/2001 |
| JP | 2007-33284 A | 2/2007 |
| JP | 2017-68980 A | 4/2017 |
| KR | 10-1996-0042092 A | 12/1996 |
| KR | 1997-0072519 A | 11/1997 |
| KR | 10-0173259 B1 | 3/1999 |
| KR | 10-2010-0044680 A | 4/2010 |
| KR | 10-2011-0018080 A | 2/2011 |
| KR | 10-2012-0060700 A | 6/2012 |
| KR | 10-2014-0013675 A | 2/2014 |
| KR | 10-1594514 B1 | 2/2016 |
| KR | 10-2017-0062901 A | 6/2017 |
| KR | 10-1859660 B1 | 5/2018 |
| KR | 10-1963741 B1 | 3/2019 |

* cited by examiner

EQUIPMENT AND METHOD FOR INSPECTING SECONDARY BATTERY

CROSS-REFERENCE TO RELATED APPLICATION

The present application claims the benefit of the priority of Korean Patent Application No. 10-2019-0068934, filed on Jun. 11, 2019, which is hereby incorporated by reference in its entirety.

TECHNICAL FIELD

The present invention relates to equipment and a method for inspecting a secondary battery, and more particularly, to equipment and a method for inspecting a secondary battery, wherein a process for inspecting the secondary battery is simplified.

BACKGROUND ART

In generally, secondary batteries refer to chargeable and dischargeable batteries unlike primary batteries that are not chargeable. Such secondary batteries are being used in high-tech electronic devices such as cellular phones, laptop computers, camcorders, and the like.

The secondary batteries are classified into a can type in which an electrode assembly is embedded in a cylindrical or prismatic metal can and a pouch type in which an electrode assembly is embedded in a pouch-shaped case made of an aluminum laminate sheet. It has been known that a cylindrical secondary battery in the can type has the relatively large battery capacity and the stable structure.

Here, the cylindrical secondary battery comprises an electrode assembly, in which electrodes and separators are alternately stacked, and a can for accommodating the electrode assembly. Also, a method for manufacturing the cylindrical secondary battery comprises an electrode manufacturing process for manufacturing an electrode, an electrode assembly manufacturing process for manufacturing an electrode assembly by alternately stacking electrodes and separators, an electrode assembly accommodating process for accommodating the electrode assembly in a can, and a cap assembly coupling process for coupling a cap assembly to an opening portion of the can to complete the secondary battery.

Here, the method for manufacturing a cylindrical secondary battery further comprises a secondary battery inspecting process for inspecting the quality of the completed secondary battery.

However, in a secondary battery inspecting process in the related art, it is inconvenient for operators, by themselves, to put a completed secondary battery manufactured in a cap assembly coupling process into inspection equipment, and particularly, there is a problem that a large amount of inspection time is consumed because completed secondary batteries have to be inspected individually.

DISCLOSURE OF THE INVENTION

Technical Problem

The present invention has been made to solve the problem described above, and an object of the present invention is to provide equipment and a method for inspecting a secondary battery, wherein automation is applied to automatically put completed secondary batteries into inspection equipment, and work efficiency may be increased and an inspection time may be significantly reduced, by simultaneously inspecting the plurality of completed secondary batteries which are put into the inspection equipment.

Technical Solution

An equipment for inspecting a secondary battery according to the present invention in order to achieve the object described above comprises: a loading device on which a secondary battery is loadable in an upright position; and a side portion inspecting device configured to inspect a side portion of the secondary battery loaded on the loading device, wherein the side portion inspecting device comprises: an elevation unit configured to lift the secondary battery loaded on the loading device so as to be withdrawn out of the loading device from an original position and configured to cause the secondary battery to return to its original position after a first period of time elapses; and a side portion inspecting unit configured to capture an image of the side portion of the secondary battery, which is withdrawn out of the loading device by the elevation unit, thereby inspecting the side portion of the secondary battery.

The elevation unit may comprise: a magnet attachable to the secondary battery, which is loaded on the loading device, when power is applied; an elevation body configured to cause the magnet to ascend or descend; and an elevation member configured to cause the elevation body to ascend or descend so as to withdraw the secondary battery, which is attached to the magnet, out of the loading device or cause the secondary battery to return to its original position.

The side portion inspecting unit may be configured to capture the image of the side portion of the secondary battery, which is withdrawn out of the loading device by the magnet, to perform the inspection through the captured image.

The side portion inspecting device may further comprise a rotation unit configured to cause the magnet to rotate in a state in which the secondary battery is withdrawn out of the loading device so as to cause the secondary battery, which is attached to the magnet, to rotate.

The loading device may comprise a loading plate provided with one or more loading parts may be configured to accommodate the secondary battery in the upright position, wherein each of the loading parts comprises: an insertion groove in which the secondary battery is accommodated in the upright position; and a through-hole defined in a bottom surface of the insertion groove.

The equipment may further comprise an upper/lower portion inspecting device configured to inspect each of upper and lower portions of the secondary battery loaded on the loading device.

The upper/lower portion inspecting device may comprise: an upper portion inspecting member configured to inspect the upper portion of the secondary battery loaded on the loading device; and a lower portion inspecting member configured to inspect the lower portion of the secondary battery, which is loaded on the loading plate, through the through-hole defined in the loading part.

The upper portion inspecting member and the lower portion inspecting member may be configured to capture images of the respective upper and lower portions of the secondary battery to perform the inspection through the captured images.

The equipment may further comprise a transporting device configured to transport the loading device, which is positioned in a first section, to a second section in which the side portion inspecting device is positioned and transport the loading device, which is positioned in the second section, to a third section in which the upper/lower portion inspecting device is positioned.

Also, a method for inspecting a secondary battery according to the present invention comprises: a secondary battery loading step of loading a secondary battery in an upright position on a loading device positioned in a first section; a first transporting step of transporting the loading device, on which the secondary battery is loaded, from the first section to a second section; a side portion inspecting step of inspecting a side portion of the secondary battery which is loaded on the loading device and transported to the second section; and a second transporting step of transporting the loading device, on which the secondary battery of which the side portion is inspected is loaded, from the second section to a third section, wherein the side portion inspecting step comprises: an elevation process of lifting the secondary battery loaded on the loading device so as to be withdrawn out of the loading device from an original position; a side portion inspecting process of inspecting the side portion of the secondary battery withdrawn out of the loading device; and a return process of returning the inspected secondary battery to its original position.

In the elevation process, a magnet may be attached to the secondary battery loaded on the loading device, and the magnet to which the secondary battery is attached may be lifted to withdraw the secondary battery out of the loading device.

In the side portion inspecting process, an image of the side portion of the secondary battery, which is withdrawn out of the loading device by the magnet, may be captured to perform the inspection through the captured image.

The method may further comprise, after the second transporting step, an upper/lower portion inspecting step in which each of upper and lower portions of the secondary battery, which is loaded on the loading device and transported to the third section, is inspected.

The upper/lower portion inspecting step may comprise: an upper portion inspecting process of inspecting the upper portion of the secondary battery loaded on the loading device; and a lower portion inspecting process of inspecting the lower portion of the secondary battery loaded on the loading device.

In the upper portion inspecting process and the lower portion inspecting process, images of the respective upper and lower portions of the secondary battery loaded on the loading device may be captured to perform the inspection through the captured images.

Advantageous Effects

Firstly, the equipment for inspecting the secondary battery of the present invention comprises the loading device and the side portion inspecting device for inspecting the side portion of the secondary battery loaded on the loading device, wherein the side portion inspecting device has the feature of comprising the elevation unit and the side portion inspecting unit. Due to the feature, the side portions of the plurality of secondary batteries loaded on the loading device may be simultaneously inspected. Therefore, the work efficiency may be increased, and the inspection time may be significantly reduced.

Secondly, the elevation unit in the equipment for inspecting the secondary battery of the present invention has the feature of comprising the magnet, the elevation body, and the elevation member. Due to the feature, the secondary battery loaded on the loading device may be effectively discharged out of the loading device, and the discharged secondary battery may be allowed to return to the original position so as to be loaded on the loading device.

Thirdly, the side portion inspecting unit in the equipment for inspecting the secondary battery of the present invention has the features of capturing the image of the secondary battery to perform the inspection through the captured image. Due to the feature, the side portion of the secondary battery withdrawn out of the loading device by the elevation unit may be accurately inspected.

Fourthly, the side portion inspecting device in the equipment for inspecting the secondary battery of the present invention has the feature of comprising the rotation unit for allowing the secondary battery, which is attached to the magnet, to rotate. Due to the feature, the entire side portion of the secondary battery attached to the magnet may be exposed to the side portion inspecting member. As a result, the entire side portion of the secondary battery may be effectively inspected.

Fifthly, the equipment for inspecting the secondary battery of the present invention has the feature of comprising the upper/lower portion inspecting device for inspecting the upper and lower portions of the secondary battery loaded on the loading device. Due to the feature, the upper and lower portions of the secondary battery may be effectively inspected while being loaded on the loading device. As a result, the inspection time may be significantly reduced.

Sixthly, the upper/lower portion inspecting device in the equipment for inspecting the secondary battery of the present invention has the feature of comprising the upper portion inspecting member and the lower portion inspecting member. Due to the feature, the upper and lower portions of the secondary battery loaded on the loading device may be accurately inspected.

Seventhly, the equipment for inspecting the secondary battery of the present invention has the feature of comprising the transporting device. Due to the feature, the loading device, on which the secondary battery is loaded, is transported to the second section in which the side portion inspecting device is positioned, and the loading device, which is positioned in the second section, may be automatically transported to the third section in which the upper/lower portion inspecting device is positioned. Therefore, the work efficiency may be increased, and the inspection time may be significantly reduced.

MODE FOR CARRYING OUT THE INVENTION

Figure 1:
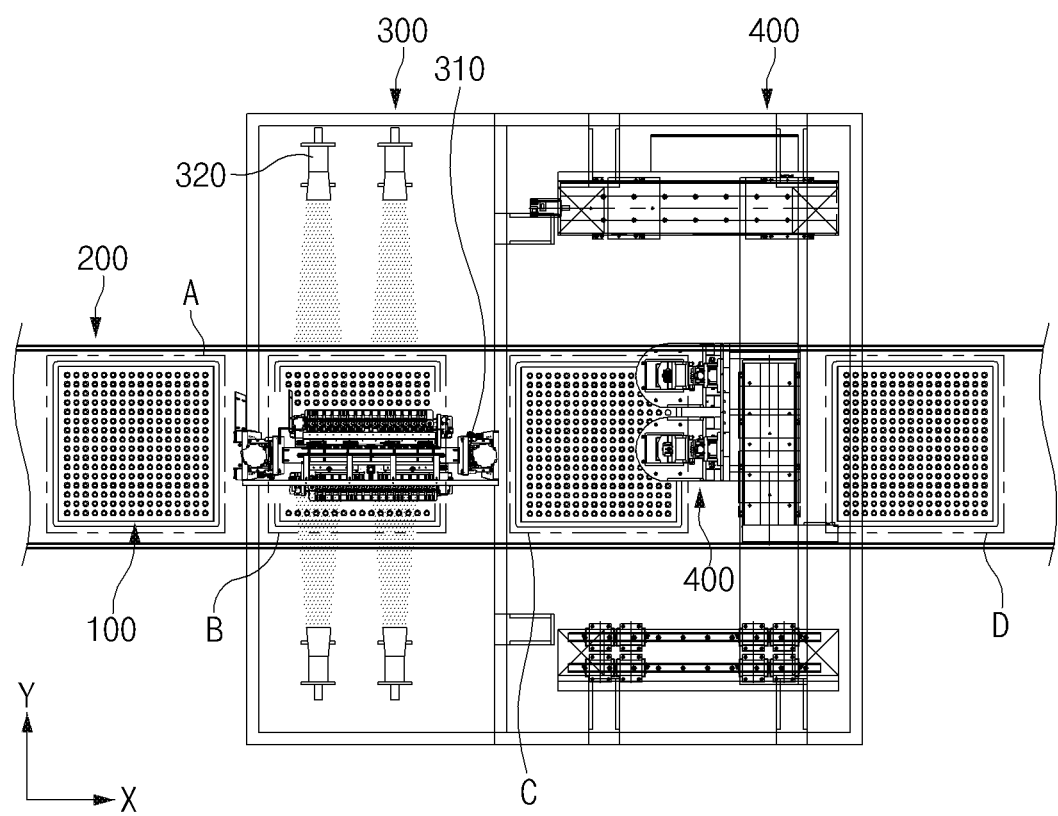
FIG. 1 is a plan view illustrating equipment for inspecting a secondary battery according to a first embodiment of the present invention.

Hereinafter, preferred embodiments of the present invention will be described in detail with reference to the accompanying drawings so as to be easily carried out by a person skilled in the art to which the present invention pertains. However, the present invention may be embodied in several different forms, and not be limited to the embodiments set forth herein. In the drawings, anything unnecessary for describing the present invention will be omitted for clarity, and also like reference numerals refer to like elements throughout.

[Secondary Battery According to a First Embodiment of the Present Invention]

A secondary battery 10 according to a first embodiment of the present invention comprises an electrode assembly, a can for accommodating the electrode assembly, and a cap assembly mounted on an opening portion of the can.

An inspection process is performed to inspect whether or not a failure occurs in the secondary battery 10 according to the first embodiment of the present invention, which has the above constituents. Here, equipment for inspecting the secondary battery according to the first embodiment of the present invention is used.

Particularly, the equipment for inspecting the secondary battery according to the first embodiment of the present invention has a structure for inspecting each of side portions and upper and lower portions of a plurality of secondary batteries 10. Thus, work efficiency for the secondary batteries may increase, and an inspection time may be reduced.

Hereinafter, the equipment for inspecting the secondary battery of the present invention will be described in more detail.

[Equipment for Inspecting the Secondary Battery According to the First Embodiment of the Present Invention]

As illustrated in FIGS. 1 to 12, the equipment for inspecting the secondary battery according to the first embodiment of the present invention comprises: a loading device 100 on which a can-type secondary battery 10 (hereinafter, referred to as a secondary battery) is loaded; a transporting device 200 for transporting the loading device 100 from a first section to a second section or from the second section to a third section; a side portion inspecting device 300 for inspecting a side portion of the secondary battery 10 which is loaded on the loading device 100 and transported to the second section by the transporting device 200; and an upper/lower portion inspecting device 400 for inspecting upper and lower portions of the secondary battery 10 which is loaded on the loading device 100 and transported to the third section by the transporting device 200.

Here, when describing the equipment for inspecting the secondary battery of the present invention, an X-axis direction indicates forward and backward directions in which the loading device 100 is transported, and a Y-axis direction indicates left and right directions perpendicular to the transportation directions of the loading device 100 as illustrated in FIG. 1.

Loading Device

Figure 2:
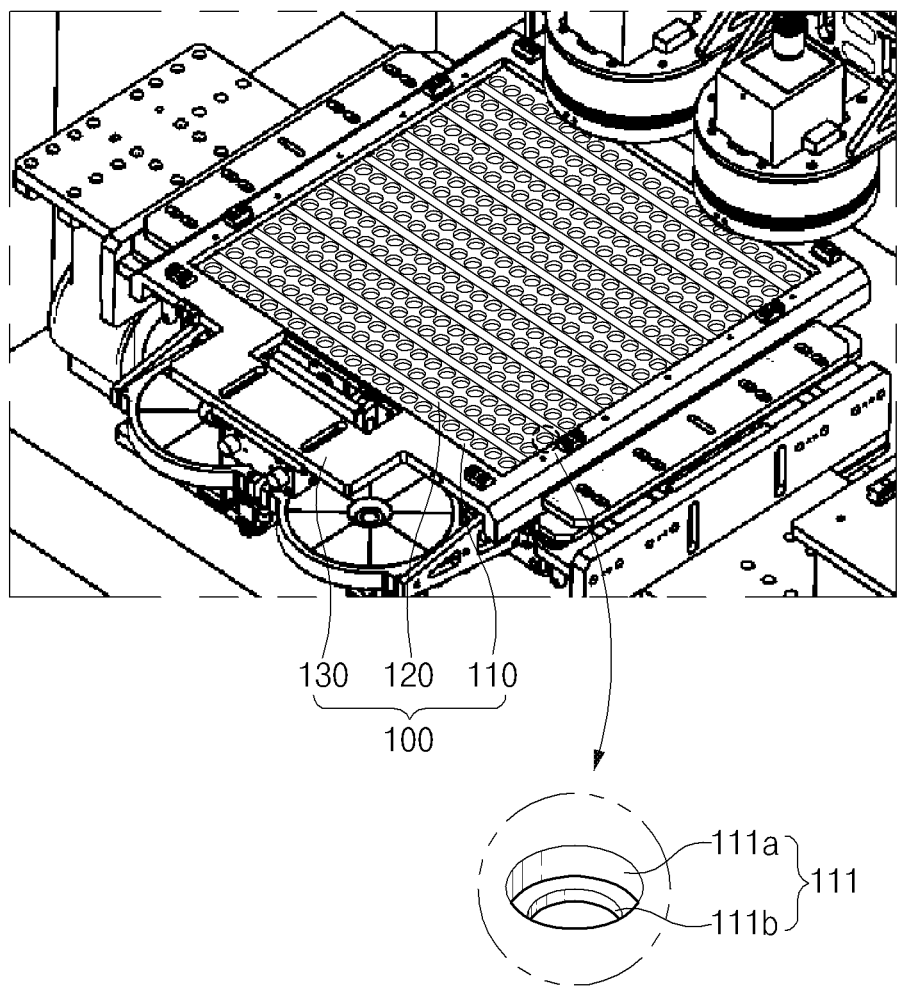
FIG. 2 is a perspective view illustrating a loading device of the equipment for inspecting the secondary battery according to the first embodiment of the present invention.
Figure 3:
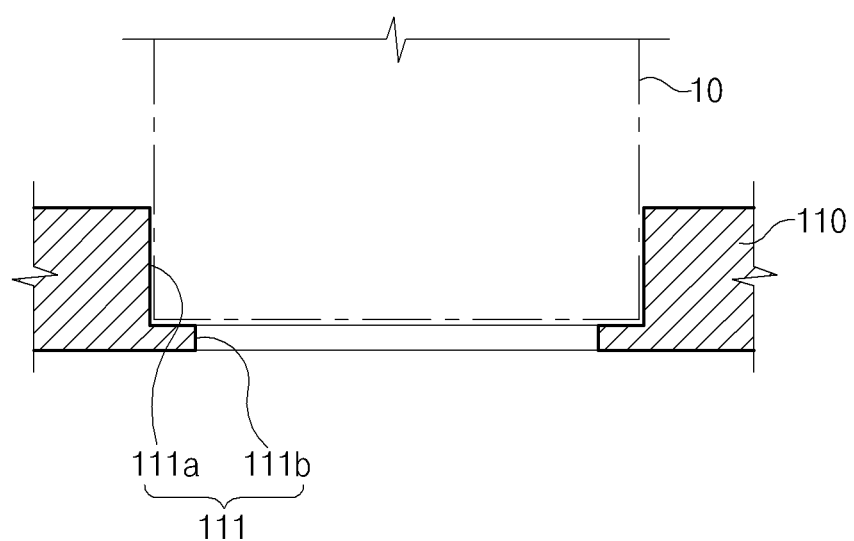
FIG. 3 is a cross-sectional view illustrating a loading part of the loading device of FIG. 2.
Figure 4:
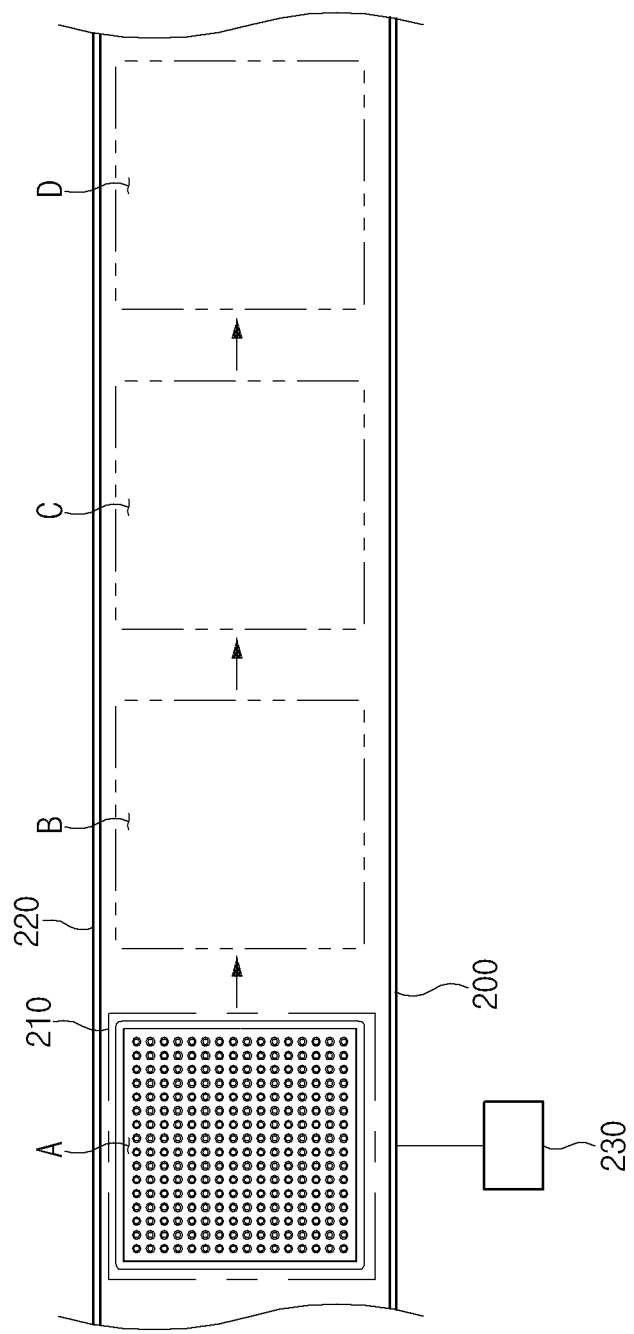
FIG. 4 is a plan view illustrating a transporting device of the equipment for inspecting the secondary battery according to the first embodiment of the present invention.
Figure 5:
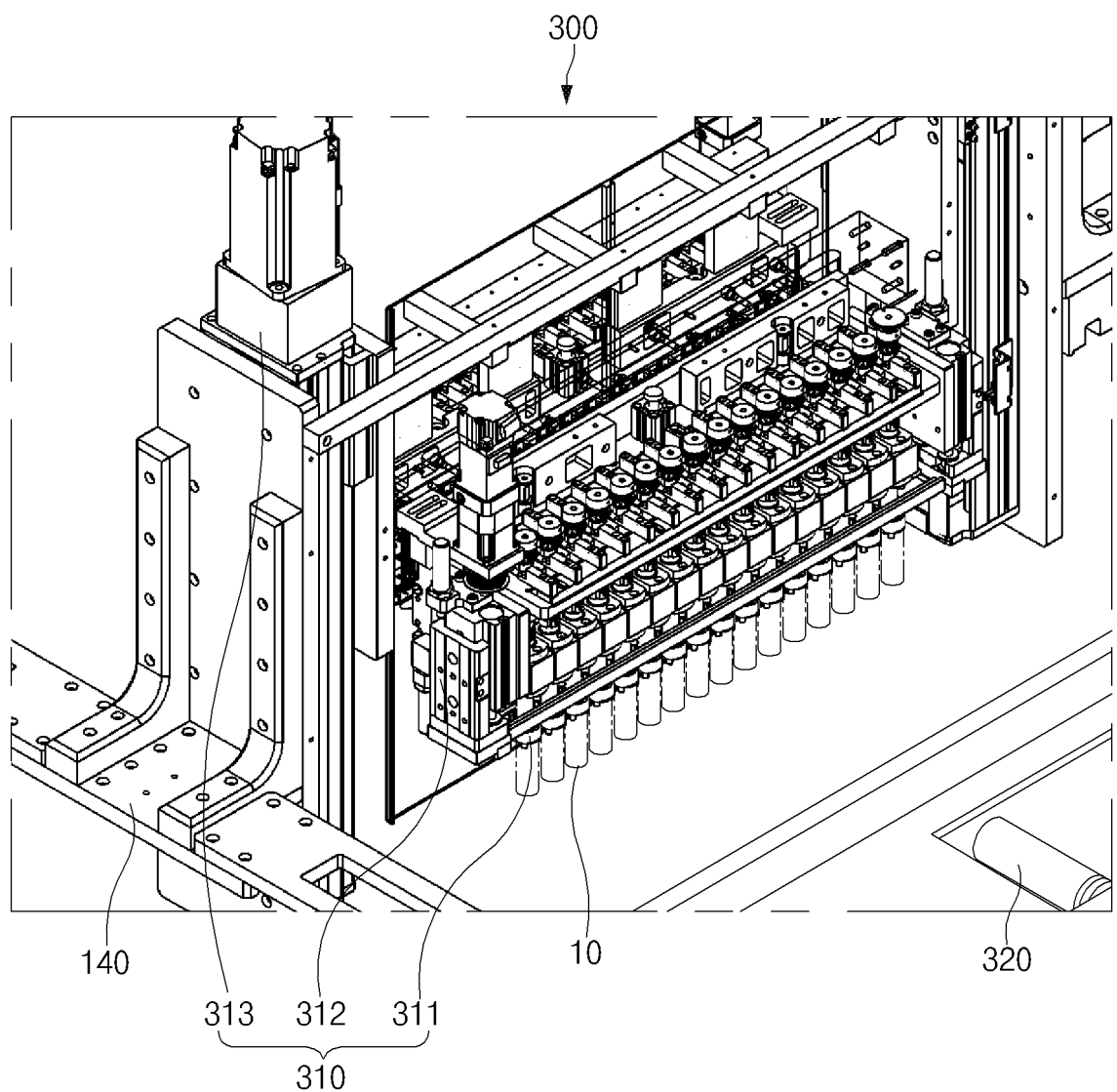
FIG. 5 is a perspective view illustrating a side portion inspecting device of the equipment for inspecting the secondary battery according to the first embodiment of the present invention.
Figure 6:
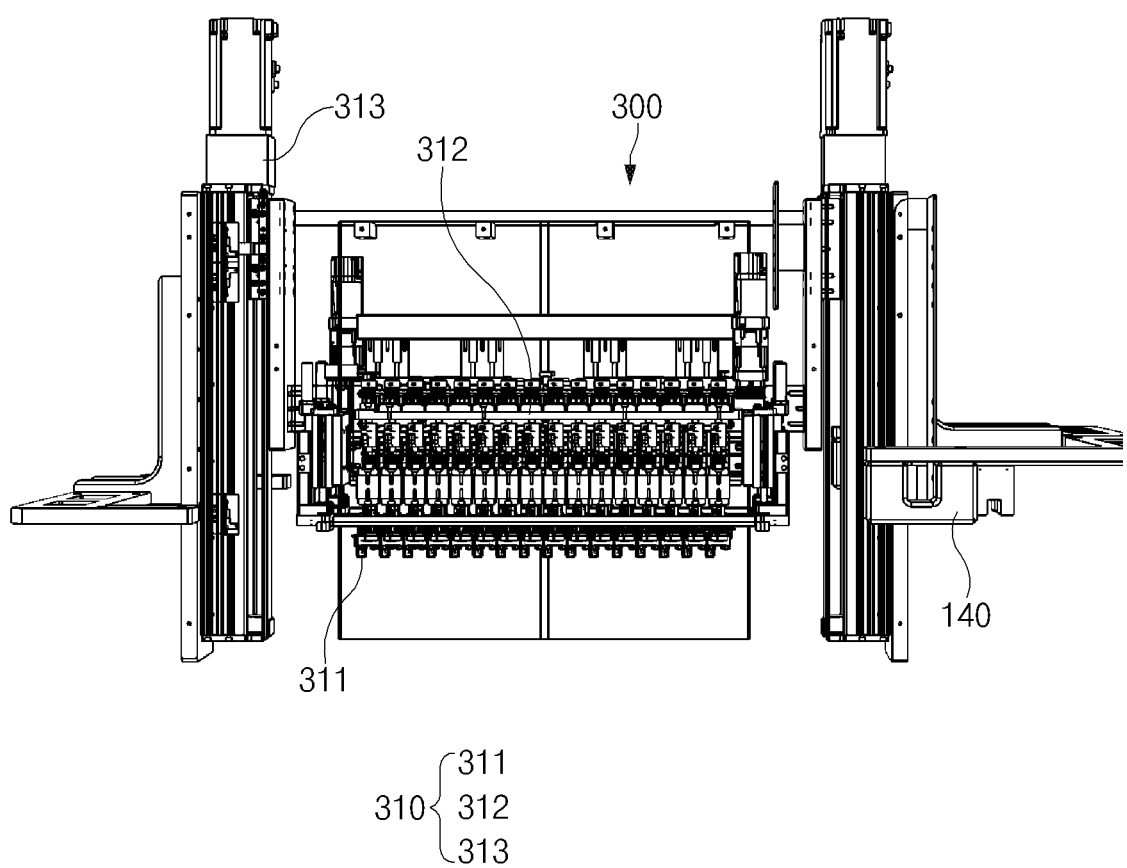
FIG. 6 is a front view illustrating the side portion inspecting device of the equipment for inspecting the secondary battery according to the first embodiment of the present invention.
Figure 7:
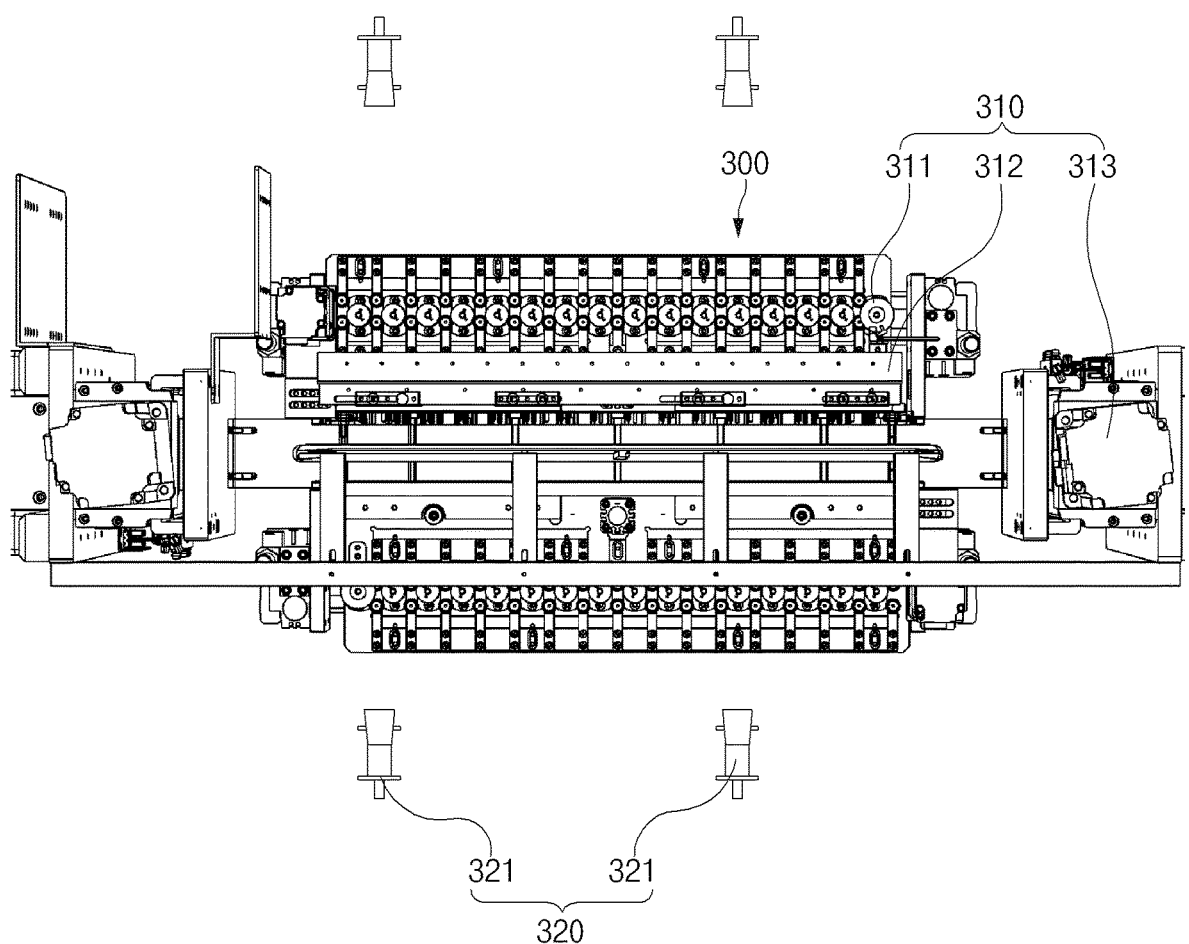
FIG. 7 is a plan view illustrating the side portion inspecting device of the equipment for inspecting the secondary battery according to the first embodiment of the present invention.
Figure 8:
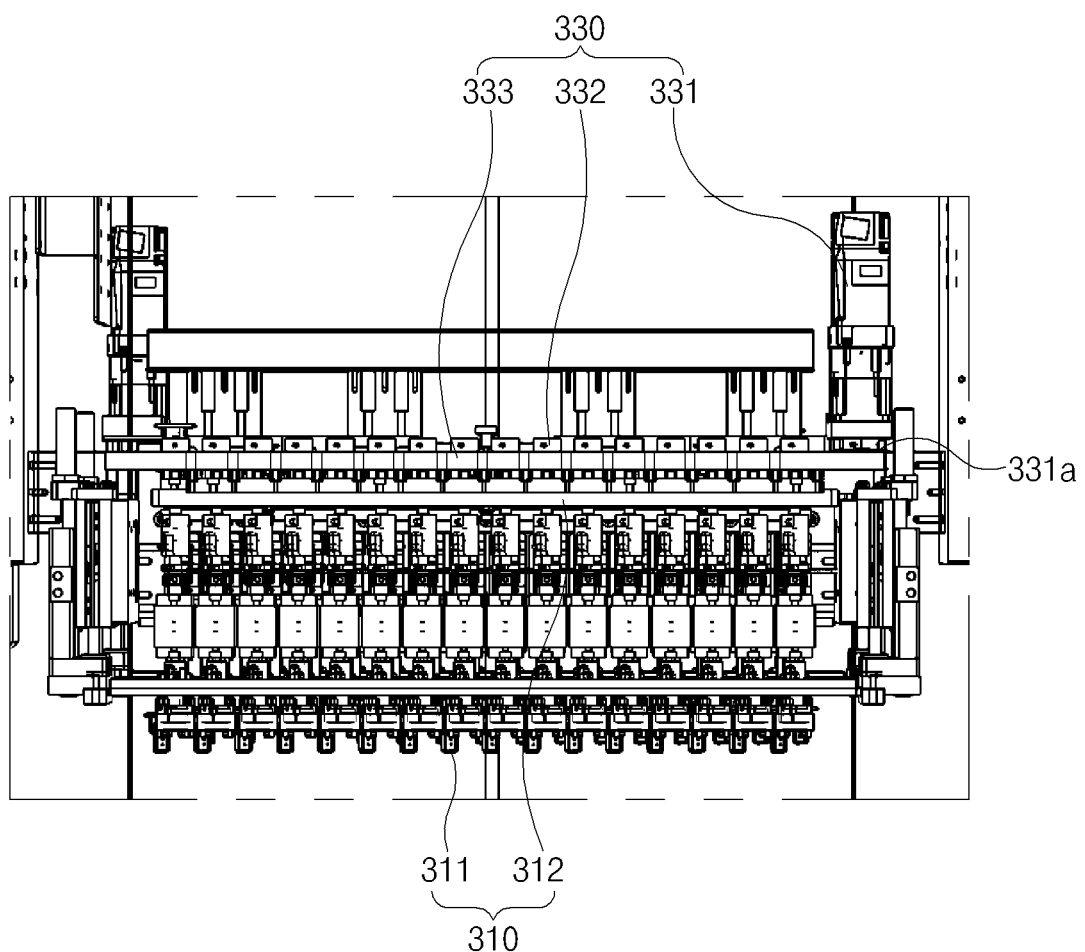
FIG. 8 is a partially enlarged view illustrating the side portion inspecting device of the equipment for inspecting the secondary battery according to the first embodiment of the present invention.

As illustrated in FIGS. 1 to 3, the loading device 100 is for loading the secondary battery, has a quadrangular shape, and comprises a loading plate 110 having a loading part 111 on which the secondary battery 10 is loaded in the upright position on the top surface, that is, in a state in which the cap assembly of the secondary battery 10 faces an upper side.

Here, the loading part 111 comprises: one or more insertion grooves 111a; and a through-hole 111b which is defined on the bottom surface of the insertion groove 111a, has a diameter smaller than that of the insertion groove 111a, and allows a lower portion of the secondary battery 10, which is accommodated in the insertion groove 111a, to be exposed to a lower side of the loading device 100.

As one example, the loading plate 110 has 256 loading parts 111 which are arranged in 16 columns and 16 rows, and thus up to 256 secondary batteries 10 may be loaded on the loading plate 110 at once.

Particularly, the loading parts 111 are regularly arranged in the top surface of the loading plate 100, and thus the 256 secondary batteries 10 loaded on the loading parts 111 may be inspected for the columns or the rows. That is, referring to FIG. 10, the secondary batteries loaded in a first column to a sixth column may be inspected sequentially, and thus the accuracy of the inspection may increase.

Here, the loading device 100 may further comprise a reinforcing bar 120 for reinforcing strength. The reinforcing bar 120 has an elongated bar shape, and is coupled to the loading plate 110 between the loading parts 111 corresponding to each other. Accordingly, the strength of the loading plate 110 may be reinforced. As a result, the loading plate 110 may be prevented from deforming even though the 256 secondary batteries 10 are loaded on the loading plate 110.

Here, the loading device 100 may further comprise a loading body 130 for protecting edge surfaces of the loading plate 110. That is, the loading body 130 has a quadrangular frame shape having a coupling hole defined on the top surface thereof, and the loading plate 110 is inserted into and coupled to the coupling hole. Therefore, the secondary batteries 10 loaded on the loading plate 110 may be protected against an external impact, and particularly, the loading plate 110 may be easily lifted or put down through a handle part provided in the loading body 130. Here, the handle part may be a groove or a protrusion defined in the loading body.

The loading device 100 having the above constituents may stably and easily load the plurality of secondary batteries 10.

Transporting Device

Referring to FIGS. 1 to 4, the transporting device 200 is for transporting the loading device on which the secondary batteries are loaded, transports the loading device 100, which is positioned in a first section A, to a second section B in which the side portion inspecting device is positioned, transports the loading device 100, which is positioned in the second section B, to a third section C in which the upper/lower portion inspecting device is positioned after a set time elapses, and transports the loading device 100, which is positioned in the third section C, to a fourth section D after a set time elapses.

That is, the transporting device 200 transports automatically the loading device 100, which is transported from a secondary battery manufacturing process to the first section A, to the second section B, the third section C, and the fourth section D. Therefore, the work efficiency may be increased, and the inspection time may be significantly reduced.

As one example, the transporting device 200 comprises: a fixing member 210 to which the loading device 100 is fixed; a transporting conveyor 220 which operates every set time and transports the fixing member 210, to which the loading device 100 is fixed, from the first section A to the second section B, from the second section B to the third section C, and from the third section C to the fourth section D; and a control member 230 for controlling the transporting conveyor 220 to operate every set time.

The transporting device 200 having the above constituents may stably transport the loading device 100 on which the secondary batteries 10 are loaded, and as a result, the work efficiency may be significantly increased.

Side Portion Inspecting Device

Referring to FIGS. 5 to 8, the side portion inspecting device 300 is for inspecting a side portion of the secondary battery loaded on the loading device and comprises: an elevation unit 310 which lifts the secondary battery 10 loaded on the loading device 100 so as to be withdrawn out of the loading device 100 and returns to its original position after a first period of time elapses; and a side portion inspecting unit 320 which captures an image of the side portion of the secondary battery 10, which is withdrawn out of the loading device 100 by the elevation unit 310, thereby inspecting the side portion of the secondary battery 10.

The elevation unit 310 is for withdrawing the secondary battery 10, which is loaded on the loading device 100, out of the loading device 100, and comprises: a magnet 311 having a magnetic force and attached to the secondary battery 10 loaded on the loading device 100; an elevation body 312 to which one or more magnets 311 are coupled and which allows the one or more magnets 311 to ascend or descend; and an elevation member 313 which allows the elevation body 312 to ascend or descend so as to withdraw the secondary batteries 10, which are attached to the magnets 311, out of the loading device 100 or allow the secondary batteries 10 to return to its original positions.

The magnet 311 is attached, by the magnetic force, to the cap assembly made of metal in the secondary battery 10.

Particularly, the magnet 311 comprises a detection sensor, and the detection sensor detects whether or not the secondary battery 10 is attached to the magnet 311.

Here, the number of magnets 311 is equal to the number of loading parts arranged in one column among the loading parts 111 provided in the loading plate 110 (the number of loading parts arranged in the X-axis direction indicated in FIG. 1), and thus the secondary batteries 10 loaded in one column among the loading parts 111 may be simultaneously lifted and withdrawn out the loading plate 110.

The elevation body 312 is coupled to the magnets 311 and may allow the magnets 311 to ascend or descend. That is, the elevation body 312 may allow the plurality of magnets 311 to ascend or descend simultaneously. Particularly, the elevation body comprises a cylinder for separating the secondary battery attached to the magnet 311, and the cylinder separates the secondary battery 10 attached to the magnet 311 when the secondary battery is returned to the original position.

The elevation member 313 allows the elevation body 312 to ascend or descend so as to withdraw the secondary battery 10, which is attached to the magnet 311, out of the loading device 100 or allow the secondary battery 10 to return to its original position.

In more detail, the elevation member 313 allows the elevation body 312 to ascend, thereby allowing the magnet attached to the elevation body 312 to ascend. Consequently, the secondary battery 10 attached to the magnet 311 is withdrawn out of the loading part 111 while ascending. Also, the elevation member 313 returns the magnet 311 to the original position by allowing the elevation body 312 to descend after the first period of time elapses. Consequently, the secondary battery 10 attached to the magnet 311 is returned to the original position while being loaded on the loading part 111. Subsequently, the secondary battery 10 attached to the magnet 311 is separated by the cylinder of the elevation body 312.

Here, the magnet 311 may be an electromagnet. That is, since the magnet 311 is provided as the electromagnet having the magnetic force when power is applied, the secondary battery 10 may be easily attached and separated. Particularly, the cylinder for separating the secondary battery from the magnet may be removed, and thus simplification in structure and reduction in manufacturing costs may be achieved.

Here, although the magnet is described as one embodiment in the present invention, any device for gripping the secondary battery to withdraw the secondary battery to the outside may be applied.

Here, the first period of time may change depending on the number of secondary batteries 10 loaded on a loading box.

The elevation unit 310 having the above constituents allows the secondary battery 10 loaded on the loading device 100 to effectively ascend or descend, and thus the secondary battery 10 may be withdrawn out of the loading device 100 or returned to the original position.

Here, the elevation unit 310 is provided in pair, and the pair of elevation units 310 may simultaneously withdraw the secondary batteries 10, which are loaded in two columns among the loading parts 111 provided in the loading device 100, out of the loading device 100. Therefore, the work efficiency may be increased, and the work time may be significantly reduced.

As one example, the pair of elevation units 310 allows the sixteen secondary batteries loaded in a first column and the sixteen secondary batteries loaded in a ninth column, in the loading plate having the loading parts 111 arranged in 16 columns by 16 rows, to be simultaneously withdrawn out of the loading plate and returned to original positions. Subsequently, the sixteen secondary batteries loaded in a second column and the sixteen secondary batteries loaded in a tenth column are simultaneously withdrawn out of the loading plate and returned to original positions. With the method described above, the secondary batteries 10 loaded on the loading parts 111 arranged in 16 columns by 16 rows may be withdrawn out of the loading plate and returned to original positions. As a result, the work efficiency may be increased, and the inspection time may be reduced by half.

Here, the loading device 100 may further comprise a first movement unit 140 for allowing the elevation unit 310 to move so that the elevation unit 310 is positioned to the loading parts 111 in the second column and the tenth column of the loading plate 110, when the secondary batteries loaded in the first column and the ninth column are returned to the loading plate 110.

That is, the first movement unit 140 allows the loading device 100 to move at predetermined intervals, and thus the pair of elevation units 310 are sequentially positioned to the loading parts in the first column to the eighth column of the loading plate and the loading parts in the ninth column to sixteenth column, respectively. Therefore, the work efficiency may be increased.

Hereinafter, when describing an operation method of the elevation unit 310 in detail, the elevation body 312 is allowed to descend through the elevation member 313, the magnets 311 coupled to the elevation body 312 are brought into contact with the top surfaces of the secondary batteries 10 loaded on the loading plate 110. Then, power is applied to the magnets 311, and the secondary batteries 10 are attached to the magnets 311. Subsequently, the elevation member 313 is allowed to ascend, and thus the magnets 311 coupled to the elevation body 312 are allowed to ascend. Consequently, the secondary batteries 10 attached to the magnets 311 may be withdrawn out of the loading plate 110.

Subsequently, when the inspection of the side portions of the secondary batteries 10 attached to the magnets 311 is finished, the elevation member 313 allows the elevation body 312 to descend, and the secondary batteries 10 attached to the magnets 311 are returned to the original positions on the loading parts 111 of the loading device 100 while the magnets 311 descend in association with the elevation body 312. Then, the secondary batteries 10 attached to the magnets 311 are removed by the cylinder provided in the elevation body 312, and the elevation body 312 and the magnets 311 are returned to the original positions by the elevation member 313. Subsequently, the elevation unit is allowed to move at predetermined intervals by the first movement unit 140, and positioned to the loading parts in the next column. All the secondary batteries loaded on the loading plate are withdrawn out of the loading plate by repeating the method described above.

The elevation unit 310 having the above constituents may allow the secondary battery 10 loaded on the loading device 100 to be easily withdrawn out of the loading device 100.

The side portion inspecting unit 320 is for inspecting the side portions of the secondary batteries withdrawn out of the loading device by the elevation unit, and comprises two or more inspecting members 321 which capture images of the side portions of the secondary batteries 10, which are attached to the magnets 311 and withdrawn out of the loading device 100, to perform the inspection through the captured images.

As one example, two or more inspecting members 321 are provided corresponding to each other such that two inspecting members are on the left, and two inspecting members are on the right with respect to the elevation unit 310. Thus, the sixteen secondary batteries 10 withdrawn out of the loading device 100 by the elevation unit 310 are divided into eight and then inspected.

Here, the side portion inspecting unit 320 may also capture a fluoroscopic image of the side portion of the secondary battery 10 through x-ray photography, and thus the inside of the secondary battery 10 as well as the outside thereof may be captured. As a result, it may be inspected whether or not a failure occurs inside and outside the secondary battery. That is, the side portion inspecting unit 320 may be an optical inspection device and an X-ray inspection device.

The side portion inspecting unit 320 having the above constituents may inspect a side portion of the electrode assembly accommodated inside the secondary battery 10 as well as the side portion of the secondary battery 10. As a result, it may be more accurately inspected whether or not a failure occurs in the secondary battery 10.

Here, the side portion inspecting device 300 may further comprise a rotation member 330 for rotating the secondary battery 10 attached to the magnet so as to more accurately inspect the entire side portion of the secondary battery attached to the magnet.

Figure 9:
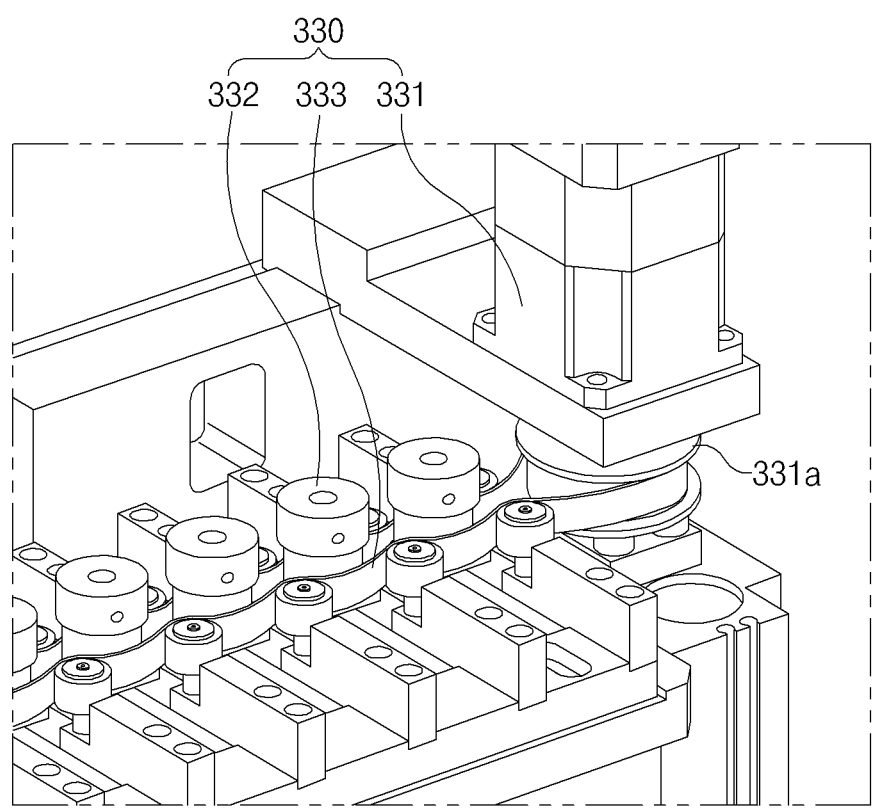
FIG. 9 is a perspective view illustrating a rotation member comprised in the side portion inspecting device of the equipment for inspecting the secondary battery according to the first embodiment of the present invention.
Figure 10:
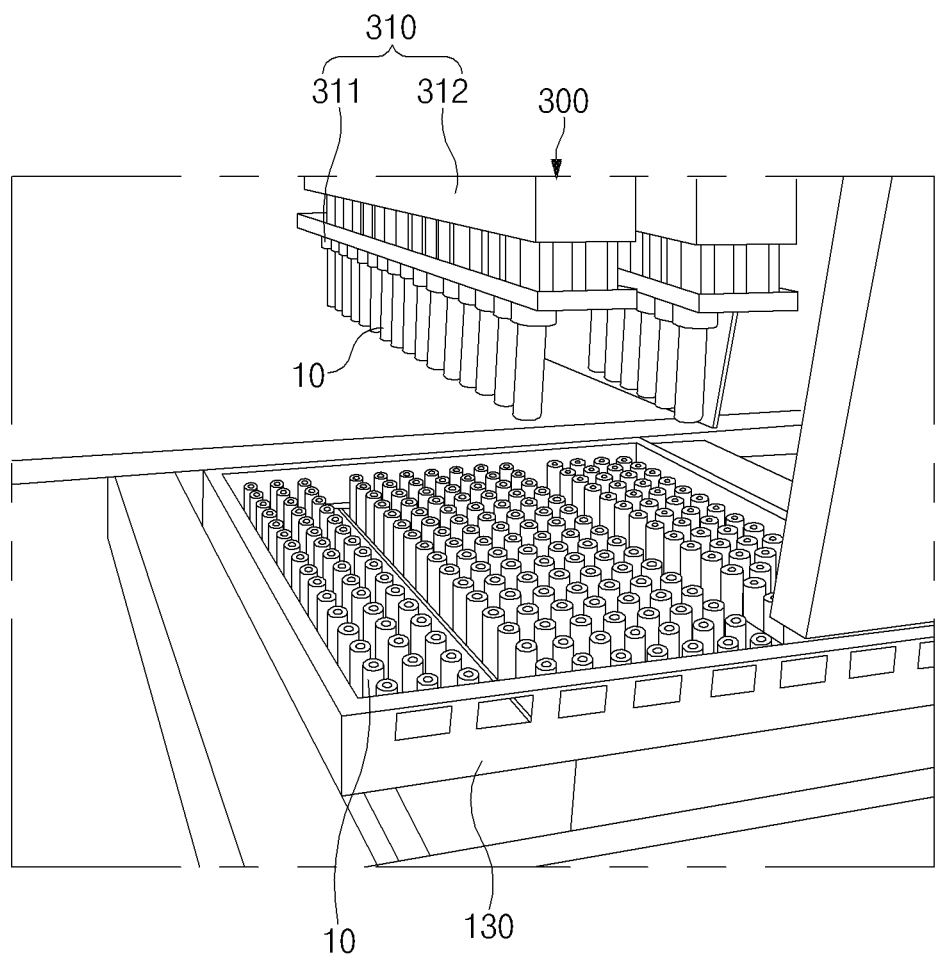
FIG. 10 is a perspective view illustrating an operation state of the side portion inspecting device of the equipment for inspecting the secondary battery according to the first embodiment of the present invention.

That is, as illustrated in FIG. 9, the rotation member 330 comprises: a rotary motor 331 provided with a driving pulley 331a; a driven pulley 332 provided between the magnet 311 and the elevation body 312 and coupling the magnet 311 to the elevation body 312 in a freely rotatable manner; and a belt 333 connecting the driving pulley 331a to the driven pulley 332 in a power transmissible manner and rotating the driven pulley 332 when the driving pulley 331a is rotated by the rotary motor 331.

The rotation member 330 having the above constituents rotates the belt 333 using the rotary motor 331, and the secondary battery 10 attached to the magnet 311 may be rotated while the magnet 311 is rotated by the belt 333. Thus, the entire side portion of the secondary battery 10 may be exposed to the side portion inspecting member 321. As a result, the entire side portion of the secondary battery 10 may be effectively and accurately inspected.

Therefore, the side portion inspecting device 300 may accurately inspect the side portions of the secondary batteries loaded on the loading device. Therefore, the work efficiency may be increased, and the inspection time may be significantly reduced.

Upper/Lower Portion Inspecting Device

Figure 11:
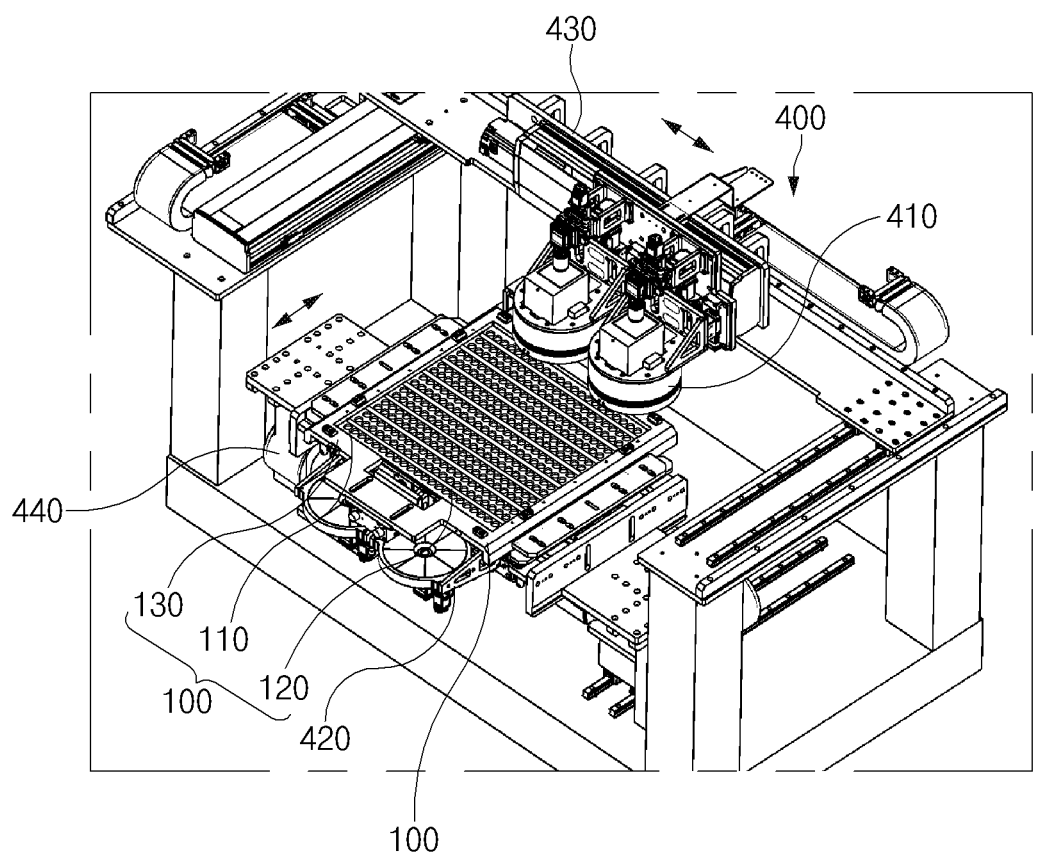
FIG. 11 is a perspective view illustrating an upper/lower portion inspecting device of the equipment for inspecting the secondary battery according to the first embodiment of the present invention.
Figure 12:
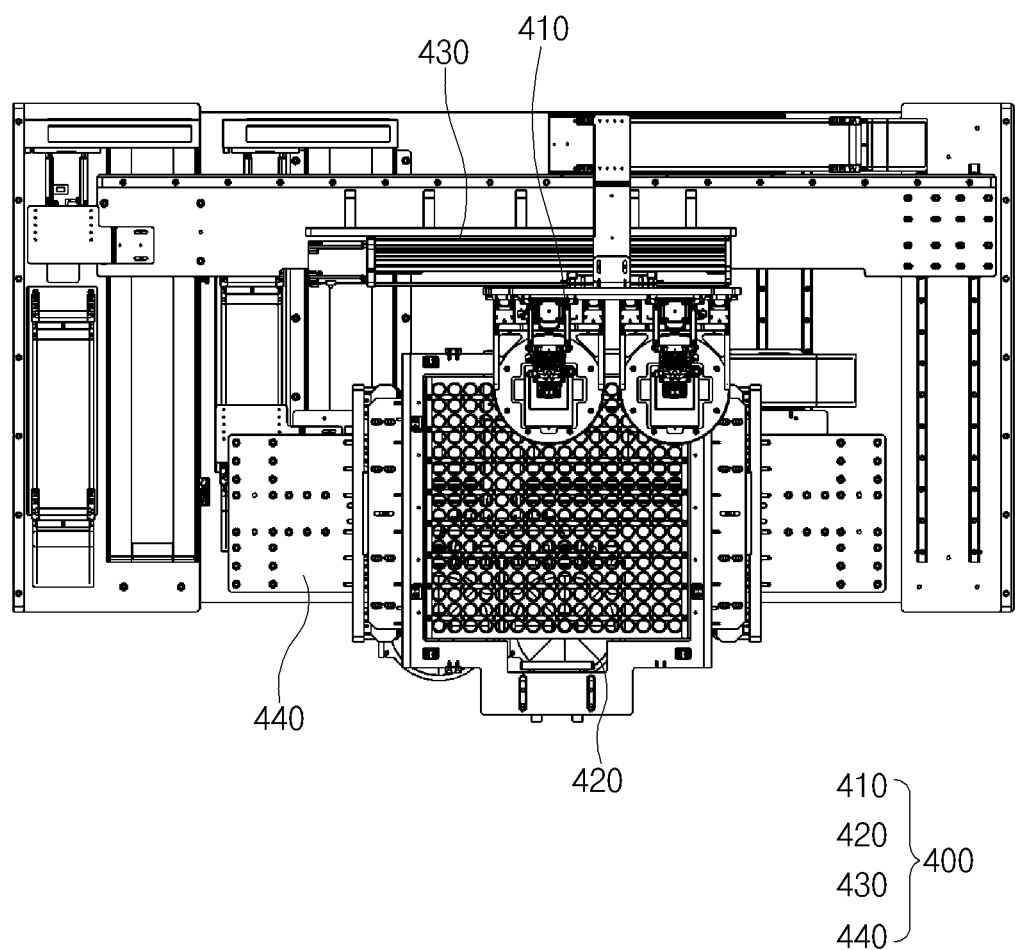
FIG. 12 is a plan view illustrating the upper/lower portion inspecting device of the equipment for inspecting the secondary battery according to the first embodiment of the present invention.

As illustrated in FIGS. 11 and 12, the upper/lower portion inspecting device 400 is for inspecting each of upper and lower portions of the secondary battery loaded on the loading device and transported to the third section, and comprises: an upper portion inspecting member 410 for inspecting the upper portion of the secondary battery 10 loaded on the loading device 100; and a lower portion inspecting member 420 for inspecting the lower portion of the secondary battery 10, which is loaded on the loading device 100, through the through-hole 111b defined in the loading device 100.

That is, the upper portion and the lower portion inspecting members 410 and 420 capture images of the respective upper and lower portions of the secondary battery 10 loaded on the loading device 100, and then inspect whether or not a failure occurs by comparing the captured images and previously input images.

Here, the upper portion and the lower portion inspecting members 410 and 420 in a fixed state may not accurately inspect all of the secondary batteries 10 loaded on the loading device 100. Thus, the upper/lower portion inspecting device 400 further comprises: a second movement unit 430 for moving the upper portion and lower portion inspecting members 410 and 420 in the Y-axis direction; and a third movement unit 440 for reciprocating the loading device 100 in the X-axis direction.

That is, the second movement unit 430 reciprocates the upper portion and lower portion inspecting members 410 and 420 in the Y-axis direction, and thus the secondary batteries loaded on the loading device 100 in the Y-axis direction may be effectively inspected. The third movement unit 440 moves the loading device 100 in the X-axis direction, and thus all of the secondary batteries arranged in the X-axis direction may be exposed to the upper portion and lower portion inspecting members 410 and 420. As a result, all of the secondary batteries 10 loaded on the loading device 100 may be inspected.

Here, each of the second and third movement units 430 and 440 comprises a belt or a motor. While the belt rotates upon rotation of the motor, the upper portion and lower portion inspecting members 410 and 420 are reciprocated in the Y-axis direction, or the loading device 100 is moved in the X-axis direction.

Here, the upper portion and lower portion inspecting members 410 and 420 may also capture fluoroscopic images of the respective upper and lower portions of the secondary battery 10 through x-ray photography, and thus even the inside of each of the upper and lower portions of the secondary battery 10 may be captured and inspected.

Thus, the equipment for inspecting the secondary battery according to the first embodiment of the present invention may continuously inspect the side portions and the upper and lower portions of the secondary batteries loaded on the loading device while transporting the loading device on which the secondary batteries are loaded. Therefore, the work efficiency may be increased, and the inspection time may be significantly reduced.

Hereinafter, a method for inspecting a secondary battery according to a second embodiment of the present invention will be described.

[Method for Inspecting a Secondary Battery According to a Second Embodiment of the Present Invention]

Figure 13:
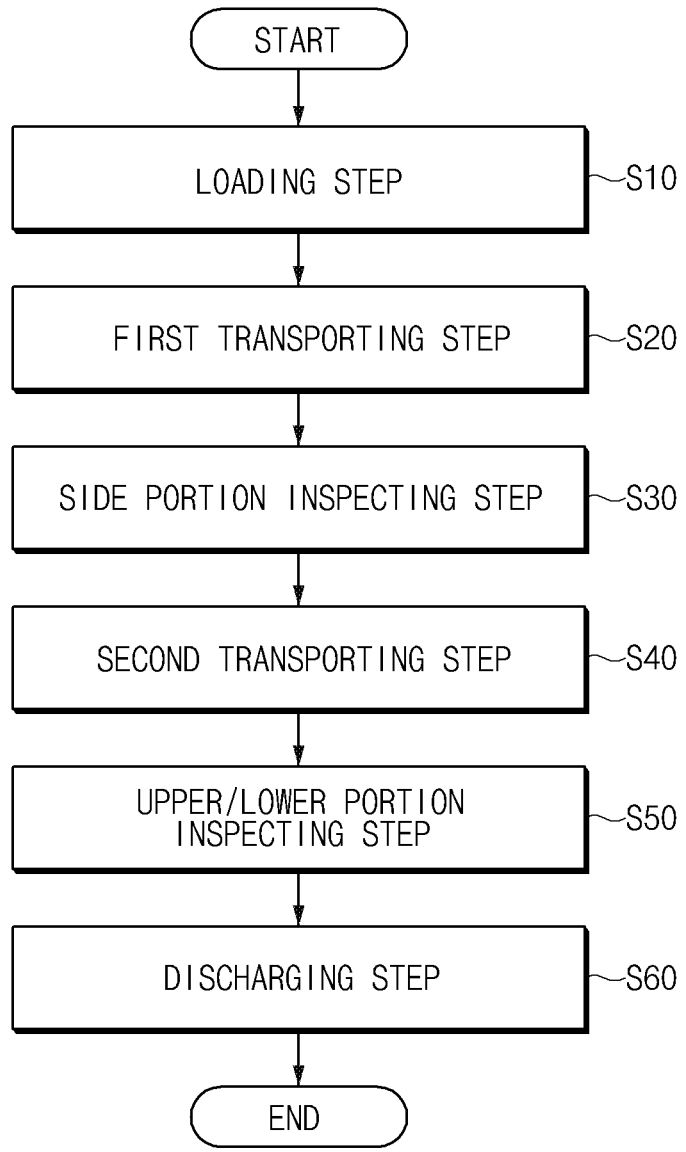
FIG. 13 is a flow chart illustrating a method for inspecting a secondary battery according to a second embodiment of the present invention.

A method for inspecting a secondary battery according to a second embodiment of the present invention comprises a loading step (S10), a first transporting step (S20), a side portion inspecting step (S30), a second transporting step (S40), an upper/lower portion inspecting step (S50), and a discharging step (S60), as illustrated in FIG. 13.

Loading Step

In the loading step (S10), each of secondary batteries 10, which are completed in a secondary battery manufacturing process, is loaded in an upright position on a loading device 100 positioned in a first section A. That is, in the loading step (S10), the secondary battery 10 is loaded in an upright position on each of loading parts 111 provided in a loading plate 110 of the loading device 100. Here, the loading parts 111 are arranged on the top surface of the loading plate 110 in 16 columns and 16 rows, and thus up to 256 secondary batteries 10 may be loaded on the top surface of the loading plate 110.

First Transporting Step

In the first transporting step (S20), the loading device 100 positioned in the first section A is transported to a second section B. That is, the loading device 100 positioned in the first section A is transported to the second section B by a transporting device 200.

Side Portion Inspecting Step

In the side portion inspecting step (S30), a side portion of each of the secondary batteries 10, which are loaded on the loading device 100 and transported to the second section, is inspected.

Figure 14:
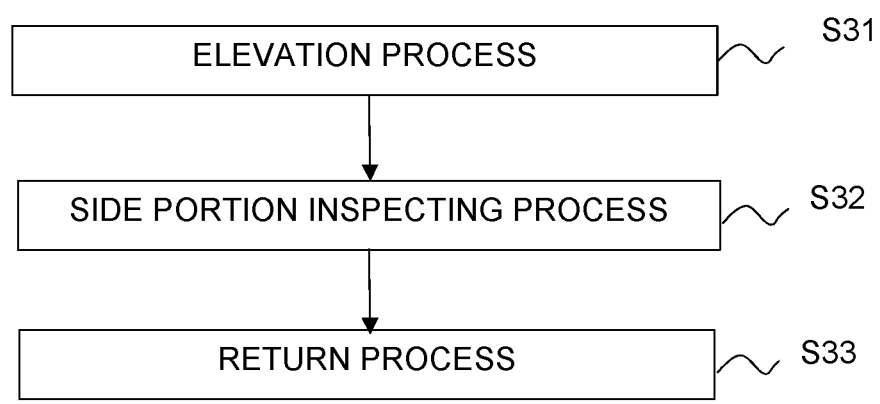
FIG. 14 is a flow chart illustrating a side inspecting step according to the second embodiment of the present invention.

That is, the side portion inspecting step (S30) comprises: an elevation process (S31) of lifting the secondary batteries 10 loaded on the loading device 100 so as to be withdrawn out of the loading device 100; a side portion inspecting process (S32) of inspecting the side portions of the secondary batteries 10 withdrawn out of the loading device 100; and a return process (S33) of returning the inspected secondary batteries 10 to their original positions as illustrated in FIG. 14.

In the elevation process (S31), the secondary batteries 10 loaded on the loading device 100 are withdrawn out of the loading device 100 through an elevation unit 310. Here, the elevation unit 310 comprises magnets 311, an elevation body 312, and an elevation member 313. That is, the elevation body 312 is allowed to descend through the elevation member 313, and the magnets 311 coupled to the elevation body 312 are brought into contact with the top surfaces of the secondary batteries 10 loaded on the loading plate 110. Thus, the secondary batteries 10 are attached to the magnets 311. Next, the elevation member 313 is allowed to ascend, and thus the magnets 311 coupled to the elevation body 312 are allowed to ascend. Consequently, the secondary batteries 10 attached to the magnet 311 may be withdrawn out of the loading plate 110.

In the side portion inspecting process (S32), the side portions of the secondary batteries are inspected through a side portion inspecting unit 320. Here, the side portion inspecting unit 320 comprises two or more side portion inspecting members 321. That is, the two or more side portion inspecting members 321 capture images of the side portions of the secondary batteries, which are attached to the magnets and withdrawn out of the loading device, to perform the inspection through the captured images.

Here, the secondary batteries attached to the magnets are rotated by a rotation member, and thus the entire side portions of the secondary batteries attached to the magnets may be exposed to the two or more side portion inspecting members 321. As a result, the side portions of the secondary batteries may be accurately inspected.

In the return process (S33), when the inspection of the side portions of the secondary batteries 10 attached to the magnets 311 are finished, the elevation member 313 descends, and the elevation body 312 descend in association with the elevation member 313. The secondary batteries 10 attached to the magnets 311 are returned to the original positions on the loading parts 111 of the loading device 100 while the magnets 311 descend in association with the elevation body 312. Next, the secondary batteries 10 attached to the magnets 311 are removed by a cylinder comprised in the elevation body 312, and the elevation body 312 and the magnets 311 are returned to the original positions by the elevation member 313.

Second Transporting Step

In the second transporting step (S40), the loading device, on which the secondary batteries of which the side portions are loaded, is transported from the second section to a third section. That is, the loading device positioned in the second section is transported to the third section by the transporting device 200.

Upper/Lower Portion Inspecting Step

Figure 15:
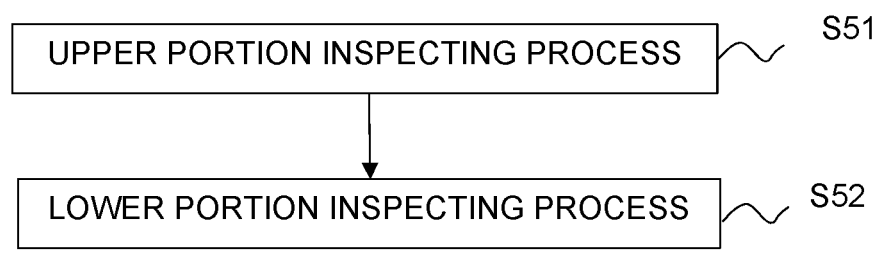
FIG. 15 is a flow chart illustrating an upper/lower inspecting step according the second embodiment of the present invention.

The upper/lower portion inspecting step (S50) comprises: an upper portion inspecting process (S51) of inspecting an upper portion of each of the secondary batteries loaded on the loading device; and a lower portion inspecting process (S52) of inspecting a lower portion each of the secondary batteries loaded on the loading device as illustrated in FIG. 15.

In the upper portion inspecting process (S51), the upper portions of the secondary batteries loaded on the loading device are inspected through an upper portion inspecting member 410. In the lower portion inspecting process (S52), the lower portions of the secondary batteries loaded on the loading device are inspected through a lower portion inspecting member 420.

Here, the upper portion inspecting member 410 and the lower portion inspecting member 420 capture images of the respective upper and lower portions of one or more secondary batteries loaded on the loading device to perform the inspection through the captured images. Thus, the upper and lower portions of the secondary batteries may be more accurately inspected.

Here, the upper/lower portion inspecting step (S50) further comprises a Y-axis movement process of moving the upper portion inspecting member 410 and the lower portion inspecting member 420 in a Y-axis direction. In the Y-axis movement process, the upper portion and lower portion inspecting members 410 and 420 are moved, by a second movement unit 430, from the secondary batteries loaded on one side of the loading device 100 in the Y-axis direction to the secondary batteries loaded on the other side. Thus, the secondary batteries loaded on the one side of the loading device 100 in the Y-axis direction to the secondary batteries loaded on the other side may be accurately inspected.

Also, the upper/lower portion inspecting step (S50) further comprises an X-axis movement process of moving the loading device 100 in an X-axis direction. Thus, in the X-axis movement process, the secondary batteries loaded on one side of the loading device 100 in the X-axis direction to the secondary batteries loaded on the other side may be exposed, by a third movement unit, to the upper portion and lower portion inspecting members 410 and 420.

Therefore, all of the secondary batteries loaded on the loading device may be accurately inspected.

Discharging Step

In the discharging step (S60), when the upper/lower portion inspecting step (S50) is finished, the loading device 100 positioned in the third section is transported to a fourth section through the transporting device 200, and then the loading device 100 is discharged.

The scope of the present invention is defined by the appended claims rather than the detailed descriptions, and it is possible to make various embodiments derived from the meaning and scope of the claims and their equivalents concept.

The invention claimed is:

1. An equipment for inspecting a secondary battery, the equipment comprising:
a loading device on which a secondary battery is loadable in an upright position; and
a side portion inspecting device comprising:
an elevation unit configured to lift the secondary battery loaded on the loading device so as to be withdrawn out of the loading device from an original position and configured to cause the secondary battery to return to its original position after a first period of time elapses; and
a side portion inspecting unit configured to capture an image of the side portion of the secondary battery, which is withdrawn out of the loading device by the elevation unit, thereby inspecting the side portion of the secondary battery.

2. The equipment of claim 1, wherein the elevation unit comprises:
a magnet attachable to the secondary battery, which is loaded on the loading device, when power is applied;
an elevation body configured to cause the magnet to ascend or descend; and
an elevation member configured to cause the elevation body to ascend or descend so as to withdraw the secondary battery, which is attached to the magnet, out of the loading device or cause the secondary battery to return to its original position.

3. The equipment of claim 2, wherein the side portion inspecting unit is configured to capture the image of the side portion of the secondary battery, which is withdrawn out of the loading device by the magnet, to perform the inspection through the captured image.

4. The equipment of claim 2, wherein the side portion inspecting device further comprises a rotation unit configured to cause the magnet to rotate in a state in which the secondary battery is withdrawn out of the loading device so as to cause the secondary battery, which is attached to the magnet, to rotate.

5. The equipment of claim 1, wherein the loading device comprises a loading plate provided with one or more loading parts configured to accommodate the secondary battery in the upright position,
wherein each of the loading parts comprises:
an insertion groove in which the secondary battery is accommodated in the upright position; and
a through-hole defined in a bottom surface of the insertion groove.

6. The equipment of claim 5, further comprising an upper/lower portion inspecting device configured to inspect each of upper and lower portions of the secondary battery loaded on the loading device.

7. The equipment of claim 6, wherein the upper/lower portion inspecting device comprises:
an upper portion inspecting member configured to inspect the upper portion of the secondary battery loaded on the loading device; and
a lower portion inspecting member configured to inspect the lower portion of the secondary battery, which is loaded on the loading plate, through the through-hole defined in the loading part.

8. The equipment of claim 7, wherein the upper portion inspecting member and the lower portion inspecting member are configured to capture images of the respective upper and lower portions of the secondary battery to perform the inspection through the captured images.

9. The equipment of claim 6, further comprising a transporting device configured to transport the loading device, which is positioned in a first section, to a second section in which the side portion inspecting device is positioned and transport the loading device, which is positioned in the second section, to a third section in which the upper/lower portion inspecting device is positioned.

10. A method for inspecting a secondary battery using the equipment for inspecting the secondary battery of claim 1, the method comprising:
a secondary battery loading step of loading the secondary battery in an upright position on the loading device positioned in a first section;

a first transporting step of transporting the loading device, on which the secondary battery is loaded, from the first section to a second section;

a side portion inspecting step of inspecting a side portion of the secondary battery which is loaded on the loading device and transported to the second section; and a second transporting step of transporting the loading device, on which the secondary battery of which the side portion is inspected is loaded, from the second section to a third section, wherein the side portion inspecting step comprises:

an elevation process of lifting the secondary battery loaded on the loading device by the elevation unit so as to be withdrawn out of the loading device from an original position;

a side portion inspecting process of inspecting the side portion of the secondary battery withdrawn out of the loading device by the side portion inspecting unit; and a return process of returning the inspected secondary battery to its original position by the elevation unit.

11. The method of claim 10, further comprising, after the second transporting step, an upper/lower portion inspecting step in which each of upper and lower portions of the secondary battery, which is loaded on the loading device and transported to the third section, is inspected.

12. The method of claim 11, wherein the upper/lower portion inspecting step comprises:

an upper portion inspecting process of inspecting the upper portion of the secondary battery loaded on the loading device; and a lower portion inspecting process of inspecting the lower portion of the secondary battery loaded on the loading device.

13. The method of claim 12, wherein, in the upper portion inspecting process and the lower portion inspecting process, images of the respective upper and lower portions of the secondary battery loaded on the loading device are captured to perform the inspection through the captured images.

14. A method for inspecting a secondary battery, the method comprising:

a secondary battery loading step of loading a secondary battery in an upright position on a loading device positioned in a first section;

a first transporting step of transporting the loading device, on which the secondary battery is loaded, from the first section to a second section;

a side portion inspecting step of inspecting a side portion of the secondary battery which is loaded on the loading device and transported to the second section; and a second transporting step of transporting the loading device, on which the secondary battery of which the side portion is inspected is loaded, from the second section to a third section, wherein the side portion inspecting step comprises:

an elevation process of lifting the secondary battery loaded on the loading device so as to be withdrawn out of the loading device from an original position;

a side portion inspecting process of inspecting the side portion of the secondary battery withdrawn out of the loading device; and a return process of returning the inspected secondary battery to its original position, wherein, in the elevation process, a magnet is attached to the secondary battery loaded on the loading device, and the magnet to which the secondary battery is attached is lifted to withdraw the secondary battery out of the loading device.

15. The method of claim 14, wherein, in the side portion inspecting process, an image of the side portion of the secondary battery, which is withdrawn out of the loading device by the magnet, is captured to perform the inspection through the captured image.

* * * * *